(12) United States Patent
Lin

(10) Patent No.: US 7,314,277 B2
(45) Date of Patent: Jan. 1, 2008

(54) BRIDGE STRUCTURE FOR GLASSES AND NOSE PAD THEREOF

(75) Inventor: Titan Lin, Taipei (TW)

(73) Assignee: Gazelle Corporation, Taipei (TW)

( * ) Notice: Subject to any disclaimer, the term of this patent is extended or adjusted under 35 U.S.C. 154(b) by 0 days.

(21) Appl. No.: 11/503,076

(22) Filed: Aug. 14, 2006

(65) Prior Publication Data

US 2007/0236649 A1  Oct. 11, 2007

(30) Foreign Application Priority Data

Apr. 11, 2006  (TW)  ............... 95206074 U

(51) Int. Cl.
G02C 5/12  (2006.01)
(52) U.S. Cl. .............. 351/136; 351/138; 351/139
(58) Field of Classification Search .............. 35/78–82, 35/136–139
See application file for complete search history.

(56) References Cited

U.S. PATENT DOCUMENTS 5,737,055 A * 4/1998 Dittmeier .................... 351/138

7,147,321 B2 * 12/2006 Van Atta .................... 351/136

FOREIGN PATENT DOCUMENTS

TW  M244468  9/2004

* cited by examiner

*Primary Examiner*—Huy Mai
(74) *Attorney, Agent, or Firm*—Rosenberg, Klein & Lee

(57) ABSTRACT

A bridge structure for glasses and nose pad thereof is disclosed. The bridge structure for glasses includes a connecting portion and two nose pads. The connecting portion has a joint hole and a clipping portion. Each of the two nose pads has an anti-sliding structure, a ventilating notch, and a plurality of rib-shaped members. The joint hole and the clipping portion are used to fix the bridge structure on the glasses. The anti-sliding structure prevents the glasses from sliding off the wearer's nose due to sweat. The ventilating notch helps dissipate heat and evaporate sweat. The rib-shaped members gently contact the user's nose and increase comfort during wear.

19 Claims, 5 Drawing Sheets

BRIDGE STRUCTURE FOR GLASSES AND NOSE PAD THEREOF

BACKGROUND OF THE INVENTION

1. Field of the Invention

The present invention relates to a bridge structure for glasses and nose pad thereof, and more particularly, to a bridge structure for glasses and nose pad thereof that prevents the glasses from sliding and improves their ventilation.

2. Description of the Prior Art

The eyes are one of the body's most vital organs. However, because they are exposed to the outside world, they can be injured easily. Glasses are used in many situations to protect and improve our eyes, such as for correcting eyesight, for shielding from UV light and glare, and for protecting eyes from possible injury at work or while playing sports. For those who need to wear glasses, especially for a long time, the comfort of the glasses is one great concern.

A soft pad structure for glasses appeared in Taiwan patent application number 092220176 outlining a structure that improved the comfort of glasses. The prior art has a soft and flexible pad with a frame body embedded on an upper edge of the glasses that gently touches the user's nose. The object of the invention was to prevent the frame body of glasses from rubbing against the user and which results from the glasses moving or collision. Moreover, the soft pad has two nose pads extending from it, which are made of the same soft and flexible material as the soft pad. The nose pads gently touch the user's nose to prevent the user from injury.

However, the glasses having nose pads of the prior art still easily slide down the user's nose due to sweat, as sweat is often unavoidable while the user works or exercises. When the nose pads escape from their original position, the user usually automatically adjusts the position of their glasses due to the discomfort caused. The adjusting action however, often causes the user further injury. Furthermore, if the nose pads contact the user's nose very tightly for a long time, the user may develop skin problems on the area contacting the nose pads due to the interaction of sweat and body temperature.

Therefore, the prior art is still somewhat inconvenient and can be improved upon. The inventor, after investigation and research, thus provides the present invention of logical design for improving the above-mentioned imperfections.

SUMMARY OF THE INVENTION

The present invention provides a bridge structure for glasses and nose pads thereof, which prevents the nose pads of the glasses from sliding down the user's face due to sweat, and allows moisture resulting sweat between the nose pads and the user to evaporate more easily. Thereby, skin problems that may occur where can be avoided.

To achieve the above objects, the present invention provides a bridge structure for glasses, including a connecting portion and two nose pads. The connecting portion forms a joint hole. The connecting portion has a clipping portion formed above the joint hole. Two nose pads extend downwardly and obliquely from two sides of the connecting portion, respectively. Each of the nose pads includes a base portion having an attached surface, an anti-sliding structure formed on an inner surface thereof, a ventilating notch formed on the attached surface, and a plurality of rib-shaped members formed on an outer edge of the base portion opposite the attached surface.

To achieve the above objects, the present invention further provides a nose pad, including a base portion, an anti-sliding structure, a ventilating notch and a plurality of rib-shaped members. The base portion has two opposite sides, an attached surface, and an outer edge opposite to the attached surface. The anti-sliding structure is formed on one of the sides of the base portion. The ventilating notch is formed on the attached surface of the base portion. The rib-shaped members are formed on the outer edge of the base portion.

To provide a further understanding of the invention, the following detailed description illustrates embodiments and examples of the invention, this detailed description being provided only for illustration of the invention.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE EMBODIMENTS

Figure 1:
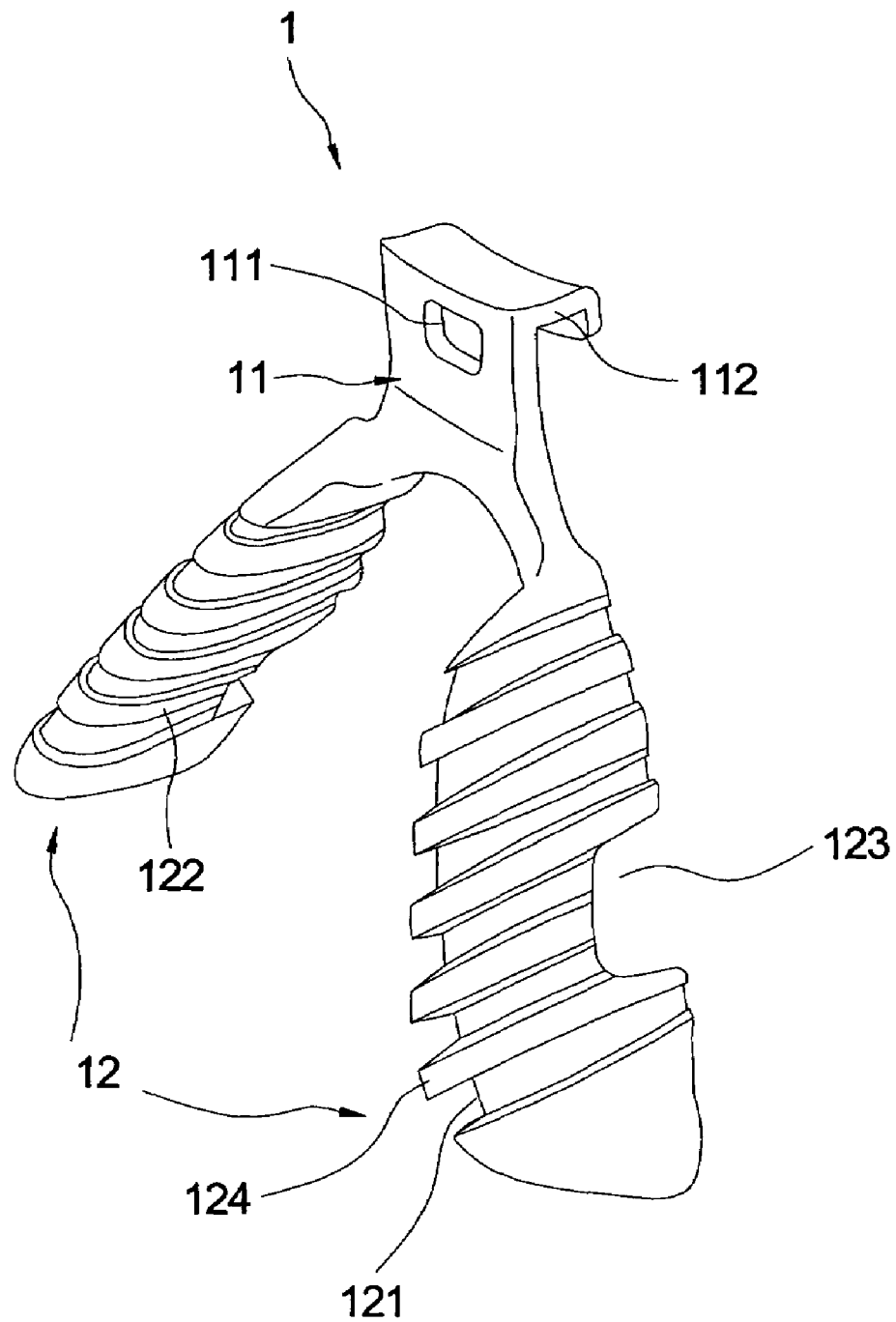
FIG. 1 is a perspective view of a bridge structure for glasses and nose pad thereof of a first embodiment according to the present invention.
Figure 2:
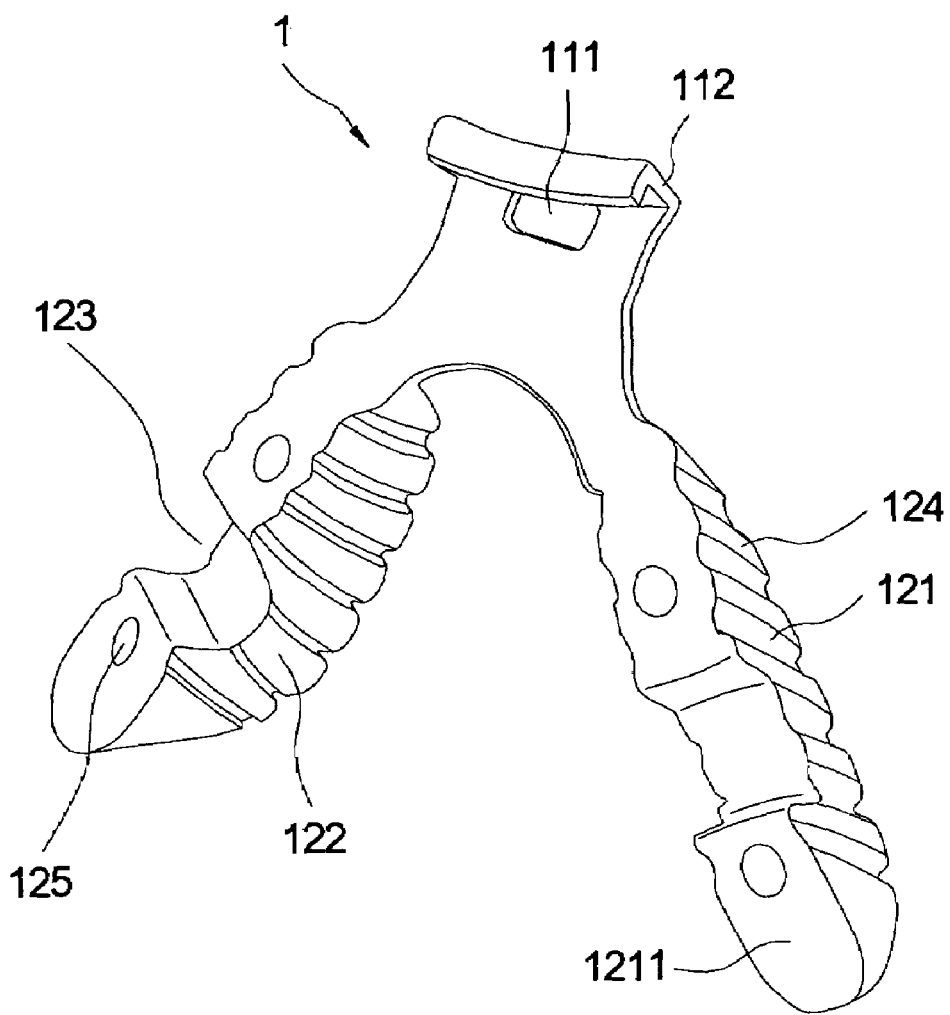
FIG. 2 is another perspective view of the bridge structure for glasses and nose pad thereof of the first embodiment according to the present invention.

Reference is made to FIGS. 1 and 2. The present invention provides a bridge structure for glasses 1, which are made of a soft, flexible material. The bridge structure for glasses 1 includes a connecting portion 11 and two nose pads 12. The connecting portion 11 has a joint hole 111 and a clipping portion 112. Each of the nose pads 12 has a base portion 121, an anti-sliding structure 122, a ventilating notch 123, a plurality of rib-shaped members 124, and two fixing holes 125.

Figure 3:
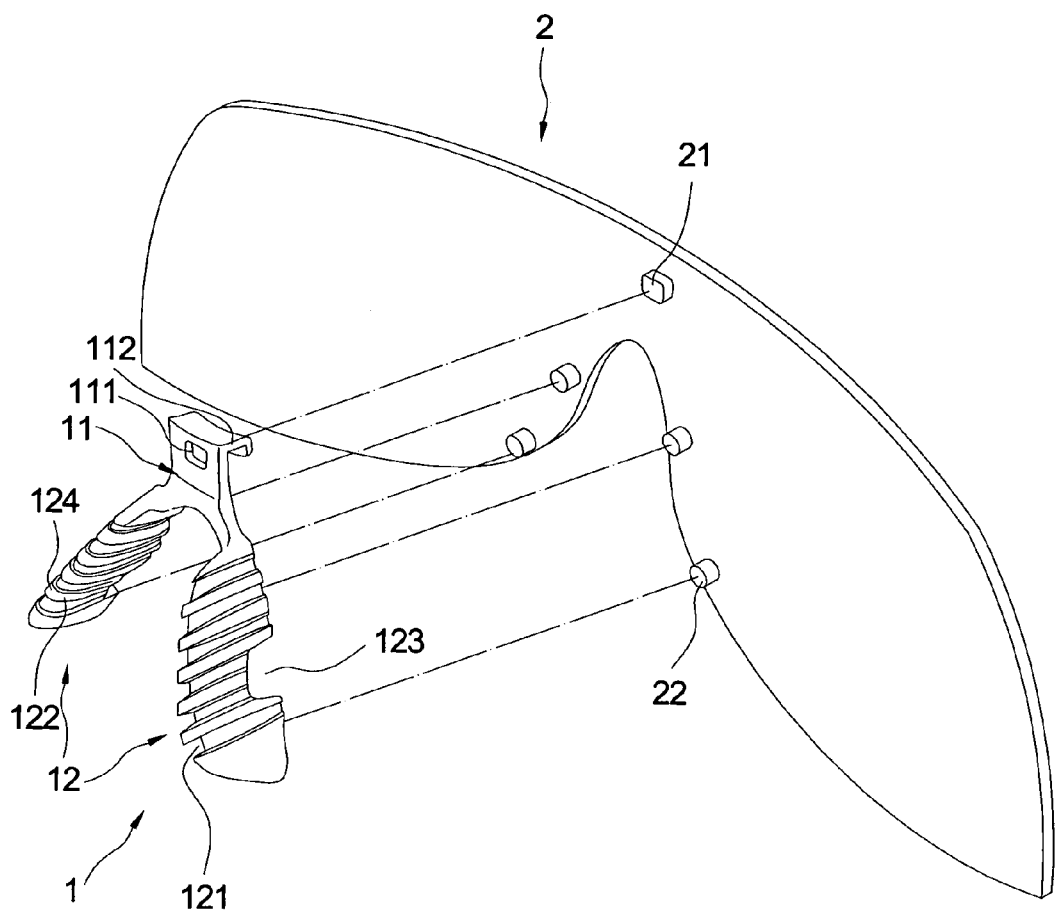
FIG. 3 is an exploded perspective view of the bridge structure for glasses and nose pad thereof of the first embodiment with a lens according to the present invention.

In FIG. 3 the connecting portion 11 connects to a lens 2. The joint hole 111 is formed on the connecting portion 11 and passes through the connecting portion 11. The clipping portion 112 is formed at a top end of the connecting portion 11 above the joint hole 111 and is U-shaped.

The nose pads 12 lean on the user's nose. The two nose pads 12 extend downwardly and obliquely from two sides of the connecting portion 11 in two opposite directions, respectively. The base portion 121 has a flat attached surface 1211 attached to the lens 2, two opposite sides, and an outer edge opposite to the attached surface 1211. The anti-sliding structure 122 is formed oppositely on the inner side of the two base portions 121, respectively. The ventilating notch 123 is formed on the attached surface 1211 of the base portions 121, which is shaped in an indentation. The rib-shaped members 124 are strip-shaped, which are located at the outer edge of the base portions 121 and are opposite to the attached surface 1211. The attached surface 1211 of the base portions 121 further has two fixing holes 125 formed therein, which are disposed at an upper side and a lower side of the ventilating notch 123, respectively. The clipping portion 112 and the nose pads 12 are disposed oppositely at two sides of the joint hole 111.

In this first embodiment of FIGS. 1 and 2, the nose pads 12 are symmetrical. The anti-sliding structure 122 is strip-shaped and is disposed parallel to the rib-shaped members 124. The anti-sliding structure 122 connects with the rib-shaped members 124 and has a symmetrical structure. In other words, the anti-sliding structure 122 and the rib-shaped members 124 are formed oppositely at two sides of the base portions 121 and have identical appearances. Both the rib-shaped members 124 and the anti-sliding structure 122 are connected together and are spread across two sides of the base portion 121.

Reference is made to FIG. 3. The bridge structure 1 is fixed on a center of an integral-type lens 2. The clipping portion 112 of the bridge structure 1 is clipped to an upper edge of the integral-type lens 2. The integral-type lens 2 forms a joint protrusion 21 corresponding to the joint hole 111 at a center of the lens 2. The joint protrusion 21 penetrates through the joint hole 111 for positioning the bridge structure 1 at the center of the integral-type lens 2. Moreover, protruding from each side of the center of the integral-type lens 2 there are two fixing posts 22 corresponding to the fixing holes 125 of the nose pads 12. The fixing posts 22 are located below the joint protrusion 21. The nose pads 12 can be fixed on the integral-type lens 2 by engaging the fixing holes 125 with the fixing posts 22. When the bridge structure 1 is fixed on the integral-type lens 2, the ventilating notch 123 of the nose pads 12 is hole-shaped.

According to the embodiment described above, the present invention has advantages as follows. Firstly, the rib-shaped members 124 contact the user's nose more gently contact. The rib-shaped members 124 reduce the pressure placed upon the user's nose from the glasses, and make the user more comfortable. Next, the anti-sliding structure 122 increases the friction between the nose pads 12 and the user's nose, which prevents the glasses from sliding down the user's nose due to sweat. It reduces the possibility of accidents resulting from adjusting the position of the glasses by the user. Moreover, the ventilating notch 123 allows moisture to evaporate. The grooves of the anti-sliding structure 122 also allow moisture to evaporate as well. Finally, the heat-dissipation and sweat-evaporation provided by the nose pads 12 of the present invention prevents the user's nose from developing skin problems caused by the wearing of glasses, even over a long period.

Figure 4:
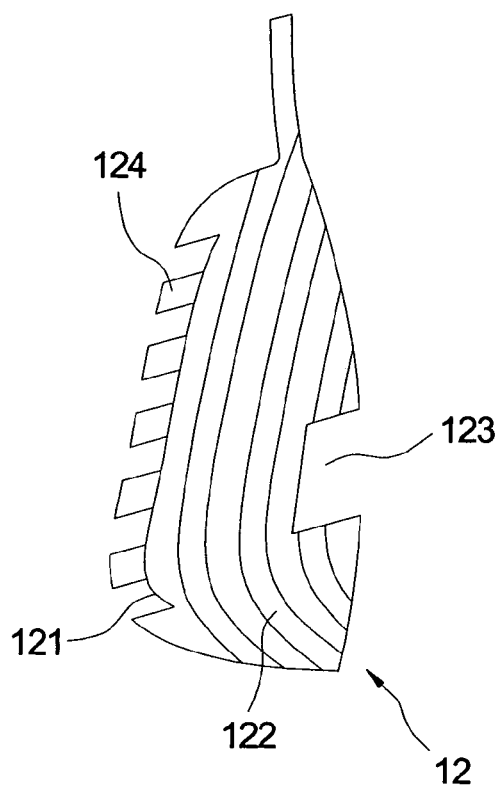
FIG. 4 is a side view of a nose pad of a second embodiment according to the present invention.
Figure 5:
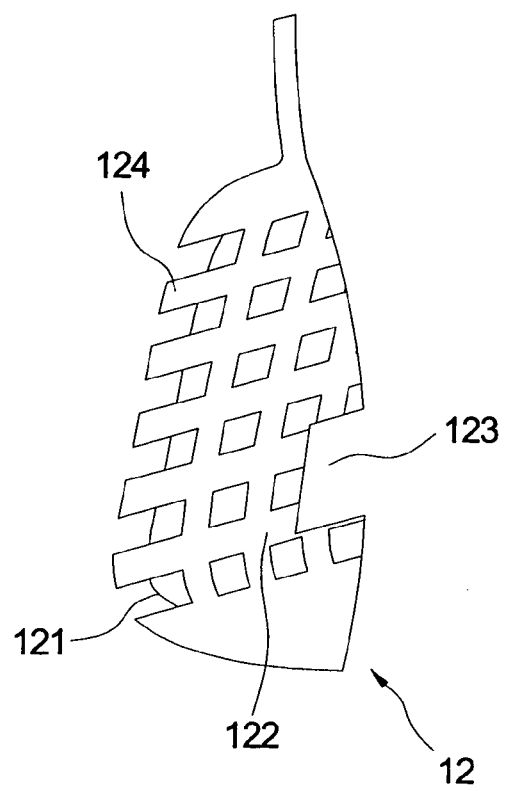
FIG. 5 is a side view of a nose pad of a third embodiment according to the present invention.

Reference is made to FIGS. 4 and 5. Besides the strip-shaped form of the anti-sliding structure 122 parallel to the rib-shaped members 124 as shown in FIGS. 1 and 2, the nose pads 12 of the present invention can have other forms. Firstly, the anti-sliding structure 122 can be strip-shaped and be perpendicular to the rib-shaped members 124 as shown in FIG. 4. Next, the anti-sliding structure 122 can also be crisscross-shaped, having a plurality of strips arranged in a crisscross pattern. In the second embodiment of the anti-sliding structure 122 perpendicular to the rib-shaped members 124, some of the anti-sliding structure 122 adjacent to the rib-shaped members 124 connects with the rib-shaped members 124.

The other embodiments illustrated above also have their advantages, respectively. In the second embodiment as shown in FIG. 4, the anti-sliding structure 122 is perpendicular to the rib-shaped members 124 and are vertical relative to the ground when being worn. In this embodiment sweat evaporates more easily due to the grooves formed between the anti-sliding structure 122 which enhance the effectiveness of the heat-dissipation and sweat-evaporation of the nose pads 12. In the third embodiment as shown in FIG. 5, the anti-sliding structure 122 has a crisscross pattern and partly connects with the rib-shaped members 124. In this embodiment, the anti-sliding effectiveness is increased due to a larger contact area and moisture can evaporate from the crisscross grooves between the anti-sliding structure 122.

Figure 6:
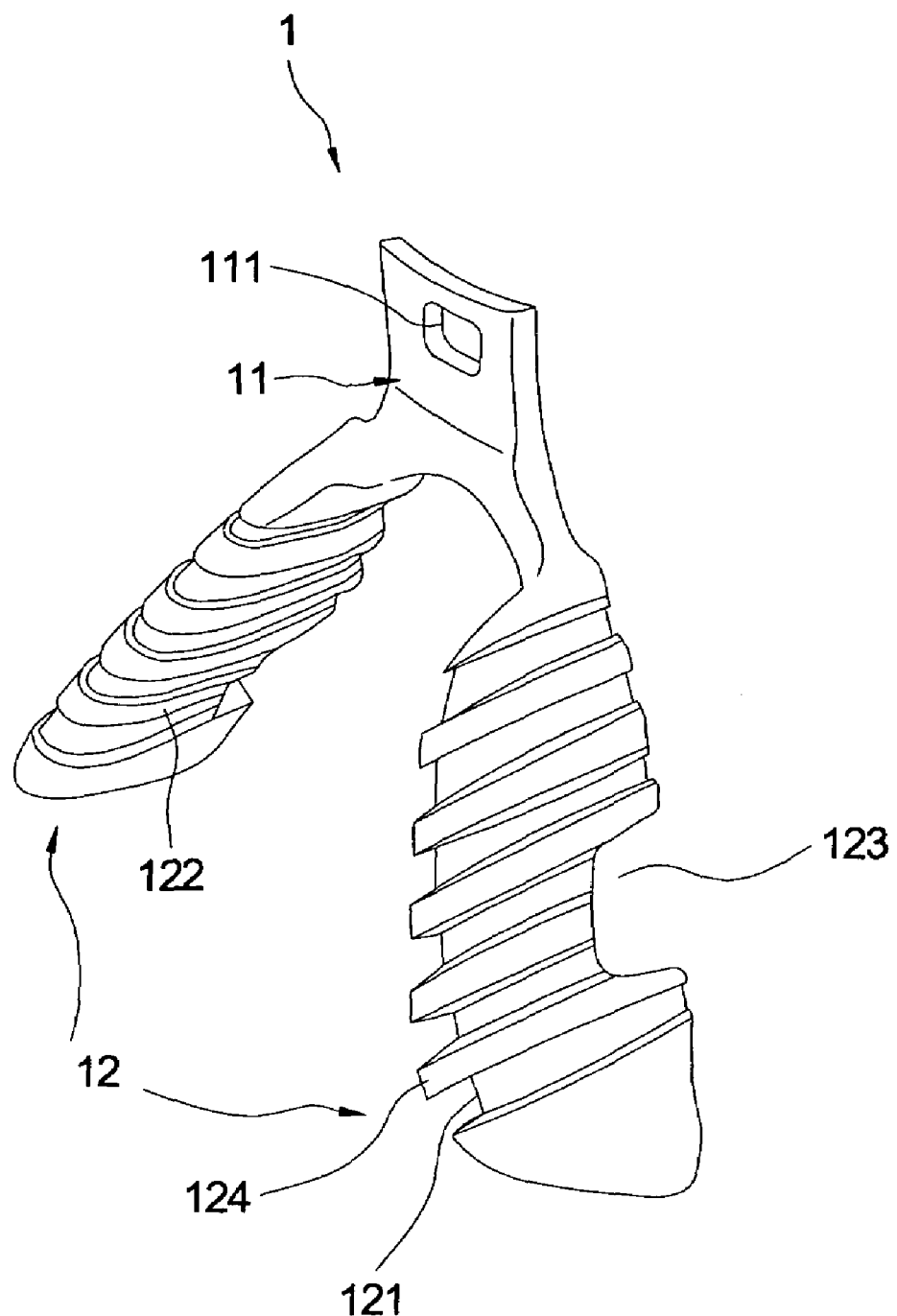
FIG. 6 is a perspective view of a bridge structure for glasses and nose pad thereof of a fourth embodiment according to the present invention.

Reference is made to FIG. 6. In this fourth embodiment, the bridge structure for glasses 1 also includes a connecting portion 11 and two nose pads 12. However, the connecting portion 11 reduces the clipping portion 112, but still has a joint hole 111. The integral-type lens 2, as shown in FIG. 3, forms a joint protrusion 21 corresponding to the joint hole 111 at a center of the lens 2. The joint protrusion 21 penetrates through the joint hole 111 for positioning the bridge structure 1 at the center of the integral-type lens 2.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A bridge structure for glasses, comprising:
   a connecting portion, forming a joint hole, the connecting portion having a clipping portion formed above the joint hole; and
   two nose pads, extending downwardly and obliquely from two sides of the connecting portion, respectively; wherein
   each of the nose pads includes a base portion having an attached surface, an anti-sliding structure formed on an inner surface thereof, a ventilating notch formed on the attached surface, and a plurality of rib-shaped members formed on an outer edge of the base portion opposite the attached surface.

2. The bridge structure for glasses as claimed in claim 1, wherein the clipping portion is formed at one side of the connecting portion opposite to the two nose pads.

3. The bridge structure for glasses as claimed in claim 1, wherein each of the base portions forms two fixing holes on the attached surface.

4. The bridge structure for glasses as claimed in claim 1, wherein the anti-sliding structure connects with the rib-shaped members.

5. The bridge structure for glasses as claimed in claim 1, wherein the anti-sliding structure is strip-shaped and parallel to the rib-shaped members.

6. The bridge structure for glasses as claimed in claim 1, wherein the anti-sliding structure is strip-shaped and perpendicular to the rib-shaped members.

7. The bridge structure for glasses as claimed in claim 1, wherein the anti-sliding structure has a crisscross shape.

8. A nose pad for glasses, comprising:
   a base portion, having two opposite sides, an attached surface and an outer edge opposite to the attached surface;
   an anti-sliding structure, formed on one of the sides of the base portion;
   a ventilating notch, formed on the attached surface of the base portion; and
   a plurality of rib-shaped members, formed on the outer edge of the base portion.

9. The nose pad for glasses as claimed in claim 8, wherein the base portion further comprises two fixing holes formed on the attached surface.

10. The nose pad for glasses as claimed in claim 8, wherein the anti-sliding structure connects with the rib-shaped members.

11. The nose pad for glasses as claimed in claim 8, wherein the anti-sliding structure is strip-shaped and parallel to the rib-shaped members.

12. The nose pad for glasses as claimed in claim 8, wherein the anti-sliding structure is strip-shaped and perpendicular to the rib-shaped members.

13. The nose pad for glasses as claimed in claim 8, wherein the anti-sliding structure has a crisscross shape.

14. A bridge structure for glasses, comprising:
a connecting portion, forming a joint hole; and
two nose pads, extending downwardly and obliquely from two sides of the connecting portion, respectively; wherein
each of the nose pads includes a base portion having an attached surface, an anti-sliding structure formed on an inner surface thereof, a ventilating notch formed on the attached surface, and a plurality of rib-shaped members formed on an outer edge of the base portion opposite the attached surface.

15. The bridge structure for glasses as claimed in claim 14, wherein each of the base portions forms two fixing holes on the attached surface.

16. The bridge structure for glasses as claimed in claim 14, wherein the anti-sliding structure connects with the rib-shaped members.

17. The bridge structure for glasses as claimed in claim 14, wherein the anti-sliding structure is strip-shaped and parallel to the rib-shaped members.

18. The bridge structure for glasses as claimed in claim 14, wherein the anti-sliding structure is strip-shaped and perpendicular to the rib-shaped members.

19. The bridge structure for glasses as claimed in claim 14, wherein the anti-sliding structure has a crisscross shape.

* * * * *